United States Patent
Jung

(10) Patent No.: US 10,237,752 B2
(45) Date of Patent: Mar. 19, 2019

(54) METHOD OF CONTROLLING OPERATION OF SMALL BASE STATION AND THE SMALL BASE STATION IN A COMMUNICATION SYSTEM

(71) Applicant: Samsung Electronics Co. Ltd., Suwon-si, Gyeonggi-do (KR)

(72) Inventor: Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/899,009

(22) Filed: May 21, 2013

(65) Prior Publication Data

US 2013/0310024 A1     Nov. 21, 2013

(30) Foreign Application Priority Data

May 21, 2012   (KR) .................. 10-2012-0053740

(51) Int. Cl.
    *H04W 84/04*   (2009.01)
    *H04W 52/02*   (2009.01)
    *H04W 24/02*   (2009.01)
    *H04W 16/20*   (2009.01)

(52) U.S. Cl.
    CPC .......... *H04W 16/20* (2013.01); *H04W 24/02* (2013.01); *H04W 52/0206* (2013.01); *H04W 84/045* (2013.01); *Y02D 70/00* (2018.01)

(58) Field of Classification Search
    CPC .......................... H04W 24/00; H04W 24/08
    USPC ........................................................ 455/423
    See application file for complete search history.

(56) References Cited

U.S. PATENT DOCUMENTS

| 5,884,145 | A | 3/1999 | Haartsen | |
| RE39,381 | E * | 11/2006 | Hakkinen et al. | 455/525 |
| 8,838,107 | B2 * | 9/2014 | Hwang | H04W 24/10 455/436 |
| 2007/0042799 | A1 * | 2/2007 | Jubin | H04W 52/04 455/522 |
| 2007/0097939 | A1 * | 5/2007 | Nylander | H04L 61/1511 370/338 |
| 2008/0031197 | A1 * | 2/2008 | Wang et al. | 370/331 |
| 2009/0111499 | A1 * | 4/2009 | Bosch | H04W 52/325 455/522 |
| 2009/0111525 | A1 * | 4/2009 | Hwang et al. | 455/561 |
| 2009/0252073 | A1 | 10/2009 | Kim et al. | |

(Continued)

FOREIGN PATENT DOCUMENTS

| EP | 2 219 399 A1 | 8/2010 |
| WO | 2009-043002 A2 | 4/2009 |

*Primary Examiner* — Steven S Kelley
(74) *Attorney, Agent, or Firm* — Jefferson IP Law, LLP

(57) ABSTRACT

A method of controlling an operation of a small Base Station (BS) and the small BS in a communication system are provided. The method includes measuring the strengths of signals received from adjacent macro BSs, transmitting a reference signal corresponding to an Identifier (ID) of the small BS at a predetermined time, if a highest of the measured signal strengths received from the adjacent macro BSs is less than a threshold, and operating the small BS in an active mode, upon receipt of an activation signal from at least one Mobile Station (MS). The active mode is a state in which the small BS communicates with an MS within a service area of the small BS.

11 Claims, 8 Drawing Sheets

(56) References Cited

U.S. PATENT DOCUMENTS

| | | | |
|---|---|---|---|
| 2009/0253461 A1* | 10/2009 | Kuwahara | H04W 52/0206 455/561 |
| 2009/0275326 A1* | 11/2009 | Lee | H04W 48/08 455/422.1 |
| 2009/0285113 A1 | 11/2009 | Yavuz et al. | |
| 2010/0015921 A1 | 1/2010 | Yavuz et al. | |
| 2010/0067421 A1* | 3/2010 | Gorokhov et al. | 370/311 |
| 2010/0136996 A1* | 6/2010 | Han | H04W 24/02 455/452.1 |
| 2010/0323610 A1* | 12/2010 | Li | H04W 68/02 455/3.01 |
| 2011/0003597 A1* | 1/2011 | Budic | H04W 52/143 455/450 |
| 2011/0076960 A1* | 3/2011 | Yun | H04W 24/10 455/67.14 |
| 2011/0092234 A1* | 4/2011 | Kim et al. | 455/507 |
| 2012/0051260 A1* | 3/2012 | Tamaki | H04W 24/02 370/253 |
| 2012/0106349 A1 | 5/2012 | Adjakple et al. | |
| 2012/0108238 A1* | 5/2012 | Kim | H04W 48/08 455/435.1 |
| 2012/0122444 A1* | 5/2012 | Yoon et al. | 455/422.1 |
| 2012/0134455 A1* | 5/2012 | Wang | H04W 56/0015 375/354 |
| 2013/0077599 A1* | 3/2013 | Dimou | H04W 36/22 370/331 |
| 2013/0189932 A1* | 7/2013 | Shen | H04W 52/0232 455/68 |

* cited by examiner

Precipitation attenuation

METHOD OF CONTROLLING OPERATION OF SMALL BASE STATION AND THE SMALL BASE STATION IN A COMMUNICATION SYSTEM

CROSS-REFERENCE TO RELATED APPLICATIONS

This application claims the benefit under 35 U.S.C. § 119(a) of a Korean patent application filed on May 21, 2012 in the Korean Intellectual Property Office and assigned Serial No. 10-2012-0053740, the entire disclosure of which is hereby incorporated by reference.

BACKGROUND OF THE INVENTION

1. Field of the Invention

The present invention relates to a method of controlling an operation of a small Base Station (BS) and the small BS in a communication system.

2. Description of the Related Art

As terminals such as smart phones have gained popularity, the average amount of data that mobile communication users use is increasing exponentially. In addition, users' demands for higher data rates are also increasing gradually.

In general, a data rate is increased by conducting communication in a wider frequency band or by increasing spectral efficiency. However, there are limitations in increasing an average data rate by increasing spectral efficiency because preset communication technologies have already reached almost a theoretical limit of spectral efficiency and therefore it is difficult to increase the spectral efficiency above the theoretical limit by technology development. Accordingly, a method of providing a data service in a wider frequency band may be considered as a promising method for increasing data rate. Herein, an available frequency band should be considered. According to the present frequency distribution policy, a frequency band of 1 GHz or above is limited for broadband communication and an available frequency band is only a millimeter wave band of 30 GHz or above in practice. Compared to the 2-GHz band of general cellular systems (hereinafter, referred to as a 'cellular frequency band'), a signal is attenuated significantly with respect to a distance in the extremely high frequency band. If a BS uses the same power as in a general cellular system, the BS's coverage is extremely reduced due to the signal attenuation. To avert this problem, beamforming is employed to increase the transmission and reception efficiency of antennas by focusing transmission and reception power toward a narrow space.

Because of high linearity and low transmittance unlike waves in a low frequency band, millimeter waves have a very low transmission and reception performance relative to the general cellular frequency band, particularly if an obstacle exists in a communication path between a BS and a Mobile Station (MS) or an MS is located within a closed room. To overcome this problem, small BSs may be installed, which operate within the service areas of macro BSs. A small BS refers to a BS having less transmission power and a smaller service area than a macro BS. Small BSs may include a femto BS, a pico BS, an indoor BS, a relay designed to expand cell coverage, and a Remote Radio Head (RRH). A macro BS and small BSs installed within the macro BS may interfere with one another in a specific situation such as when it is raining or snowing, or before the macro BS discontinues signal transmission. Accordingly, there exists a need for a method of efficiently using small BSs installed within the service area of a macro BS only in a specific situation.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus of controlling an operation of a small Base Station (BS) in a communication system, the system including a macro BS and small BSs.

Another aspect of the present invention is to provide a method and an apparatus of determining whether to operate a small BS based on a comparison between a threshold and a signal strength of a macro BS periodically measured by the small BS and the presence or absence of a Mobile Station (MS) within the service area of the small BS.

In accordance with an aspect of the present invention, a method of controlling an operation of a small BS in a communication system is provided. The method includes measuring the strengths of signals received from adjacent macro BSs, transmitting a reference signal corresponding to an Identifier (ID) of a small BS at a predetermined time, if a highest of the measured signal strengths received from the adjacent macro BSs is less than a threshold, and operating the small BS in an active mode, upon receipt of an activation signal from at least one MS. The active mode is a state in which the small BS communicates with an MS within a service area of the small BS.

In accordance with another aspect of the present invention, a method of controlling an operation of a small BS in an MS in a communication system is provided. The method includes measuring the strengths of signals received from adjacent macro BSs and small BSs, determining a connection state between the MS and a macro BS, upon receipt of a reference signal corresponding to an ID of a small BS at a predetermined time, if a highest of the measured signal strengths received from the adjacent macro BSs is less than a threshold, and transmitting a request for activating the small BS to the macro BS, if the MS is connected or connectable to the macro BS and transmitting an activation request to the small BS, if the MS is not connected or connectable to the macro BS. The activation request requests the small BS to operate in an active mode, the active mode being a state in which the small BS communicates with an MS within a service area of the small BS.

In accordance with another aspect of the present invention, a small BS of controlling an operation in a communication system is provided. The small BS includes a signal strength measurer configured to measure the strengths of signals received from adjacent macro BSs, a transmitter configured to transmit a reference signal corresponding to an ID of the small BS at a predetermined time, if a highest of the measured signal strengths received from the adjacent macro BSs is less than a threshold, and an operation mode decider configured to operate the small BS in an active mode, upon receipt of an activation signal from at least one MS. The active mode is a state in which the small BS communicates with an MS within a service area of the small BS.

In accordance with another aspect of the present invention, an MS controlling an operation of a small BS in a communication system is provided. The MS includes a signal strength measurer configured to measure the strengths of signals received from adjacent macro BSs and small BSs, a connected state checker configured to determine a connection state between the MS and a macro BS, upon receipt of a reference signal corresponding to an ID of a small BS at a predetermined time, if a highest of the measured signal strengths received from the adjacent macro BSs and the small BSs is less than a threshold, and a transmitter configured to transmit a request for activating the small BS to the macro BS, if the MS is connected or connectable to the macro BS and to transmit an activation request to the small BS, if the MS is not connected or connectable to the macro BS. The activation request requests the small BS to operate in an active mode, the active mode being a state in which the small BS communicates with an MS within a service area of the small BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and/or other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to achieve the above-described technical aspects of the present invention. In an exemplary implementation, defined entities may have the same names, to which the present invention is not limited. Thus, exemplary embodiments of the present invention can be implemented with same or ready modifications in a system having a similar technical background.

Figure 1:
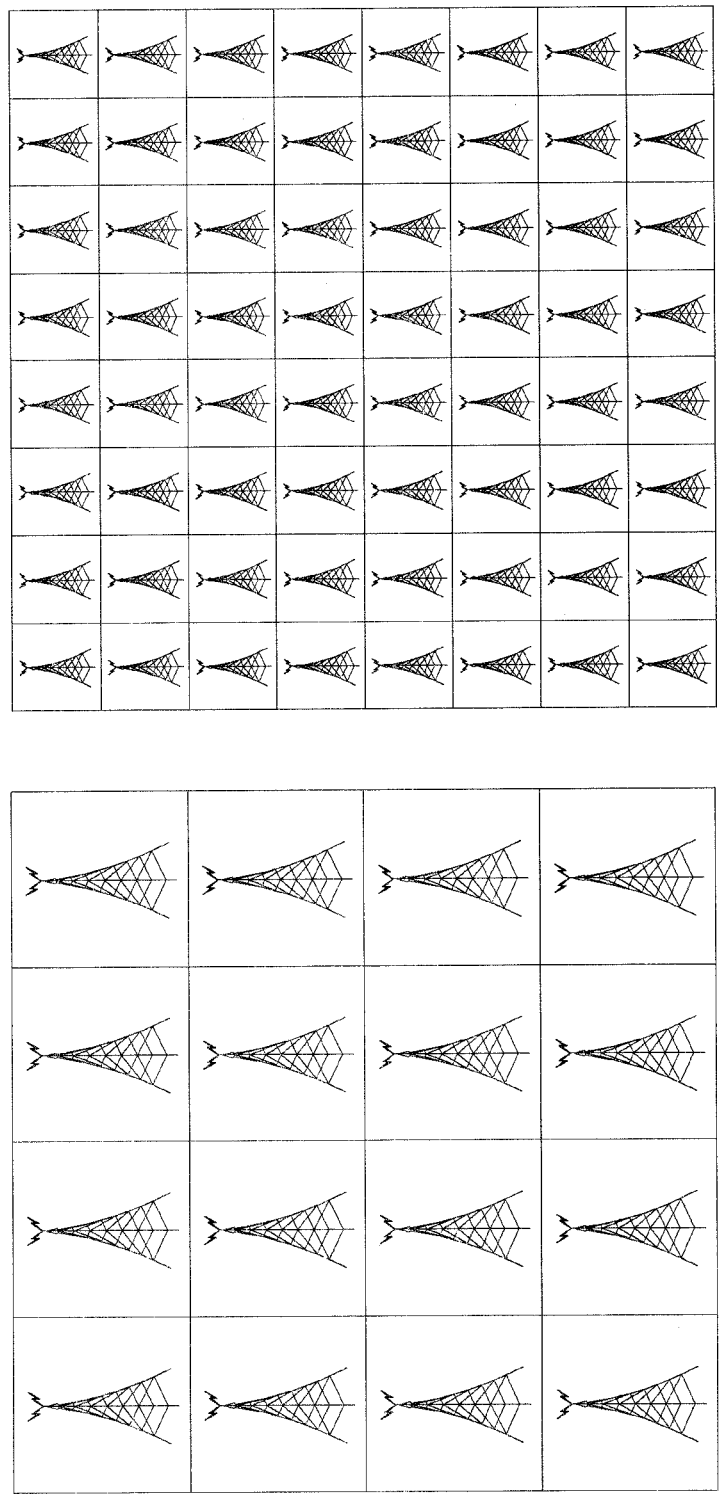
FIG. 1 is a view comparing the service areas of Base Stations (BSs) operating in a 2-GHz cellular transmission frequency band with the service areas of BSs operating in a millimeter-wave transmission frequency band in a general communication system according to an exemplary embodiment of the present invention.

FIG. 1 illustrates the difference between the service areas of Base Stations (BSs) operating in a 2-GHz cellular transmission frequency band and the service areas of BSs operating in a millimeter-wave transmission frequency band in a general communication system according to an exemplary embodiment of the present invention. It is assumed that the BSs use the same transmission power. For the convenience of description, the service area of each BS is shown as shaped in form of a rectangle.

In general, a cellular BS operating in the 2-GHz cellular frequency band is designed to have a service area ranging from 500 m to 1500 mm. Meanwhile, a BS operating in a millimeter-wave band has a service area ranging from 200 m to 500 m due to high path loss even though the millimeter-wave BS uses the same transmission power as the cellular BS. Referring to FIG. 1, for example, the density 110 of millimeter-wave BSs may be a few multiples of the density 100 of cellular BSs over the same area. This indicates that there are more millimeter-wave BSs than cellular BSs in the same area.

Besides high path loss, the millimeter-wave band faces many limitations when used for cellular communication. For example, millimeter waves tend to easily lose their energy in the presence of water molecules. If a millimeter-wave BS is installed outdoors, the BS's service area is reduced in days in which water molecules may cause communication errors such as in rainy days or in snowy days, in comparison to clear days. This is due to the property of millimeter waves.

Figure 2:
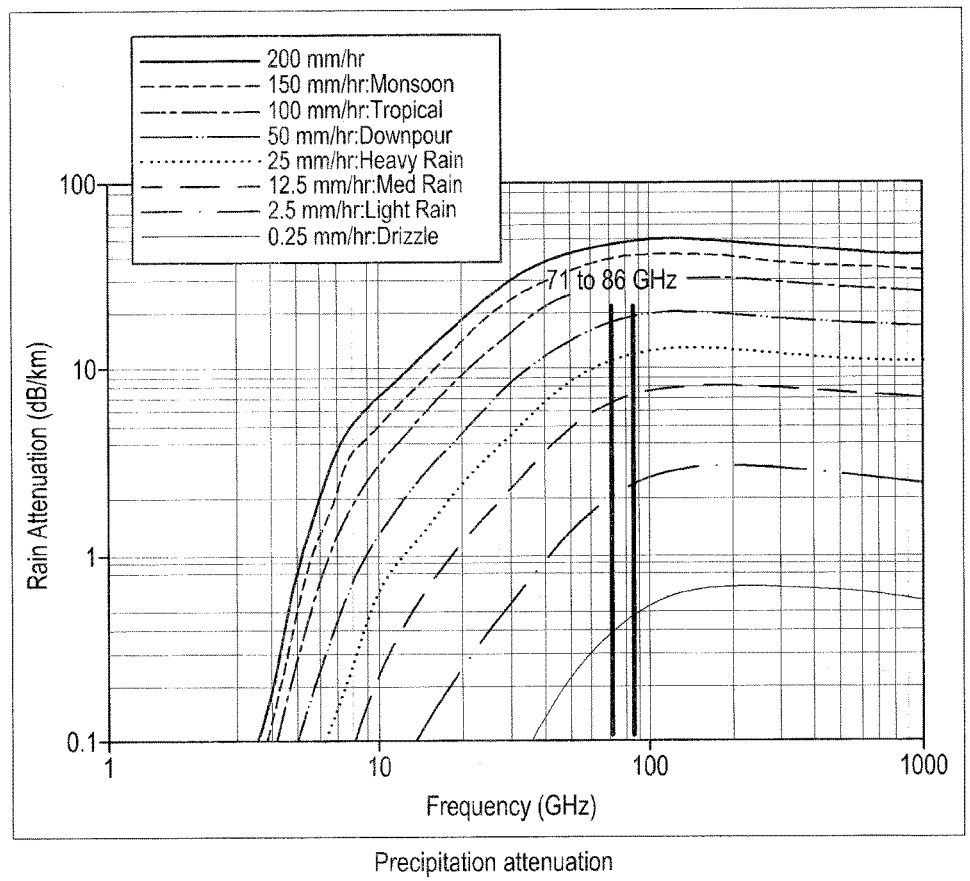
FIG. 2 illustrates rain-caused signal attenuation with respect to frequency bands and precipitations in the general communication system according to an exemplary embodiment of the present invention.

FIG. 2 illustrates rain-caused signal attenuation with respect to frequency bands and precipitations in the general communication system according to an exemplary embodiment of the present invention.

Referring to FIG. 2, a signal attenuation of 0.1 dB or below per km is observed in a 2-GHz cellular frequency band irrespective of precipitation. In contrast, a signal attenuation ranging from 4.5 dB to 6.5 dB and a signal attenuation of 10 dB are added respectively in a frequency band between 30 GHz and 40 GHz and a frequency band between 70 GHz and 80 GHz. These frequency bands are mainly considered for millimeter-wave communication.

Millimeter waves are characterized by high linearity and low transmittance, unlike low-frequency waves. Therefore, if an obstacle gets in the way of millimeter-wave communication between a BS and an MS or an MS is located in a closed room, the transmission and reception performance of millimeter waves is very low relative to that of a cellular frequency band.

As described above, if an ambient environment including weather and obstacles changes dynamically, a millimeter-wave communication system has difficulty in actively supporting communication simply by deploying more BSs, because of rain-caused signal attenuation and low wave transmittance.

Figure 3:
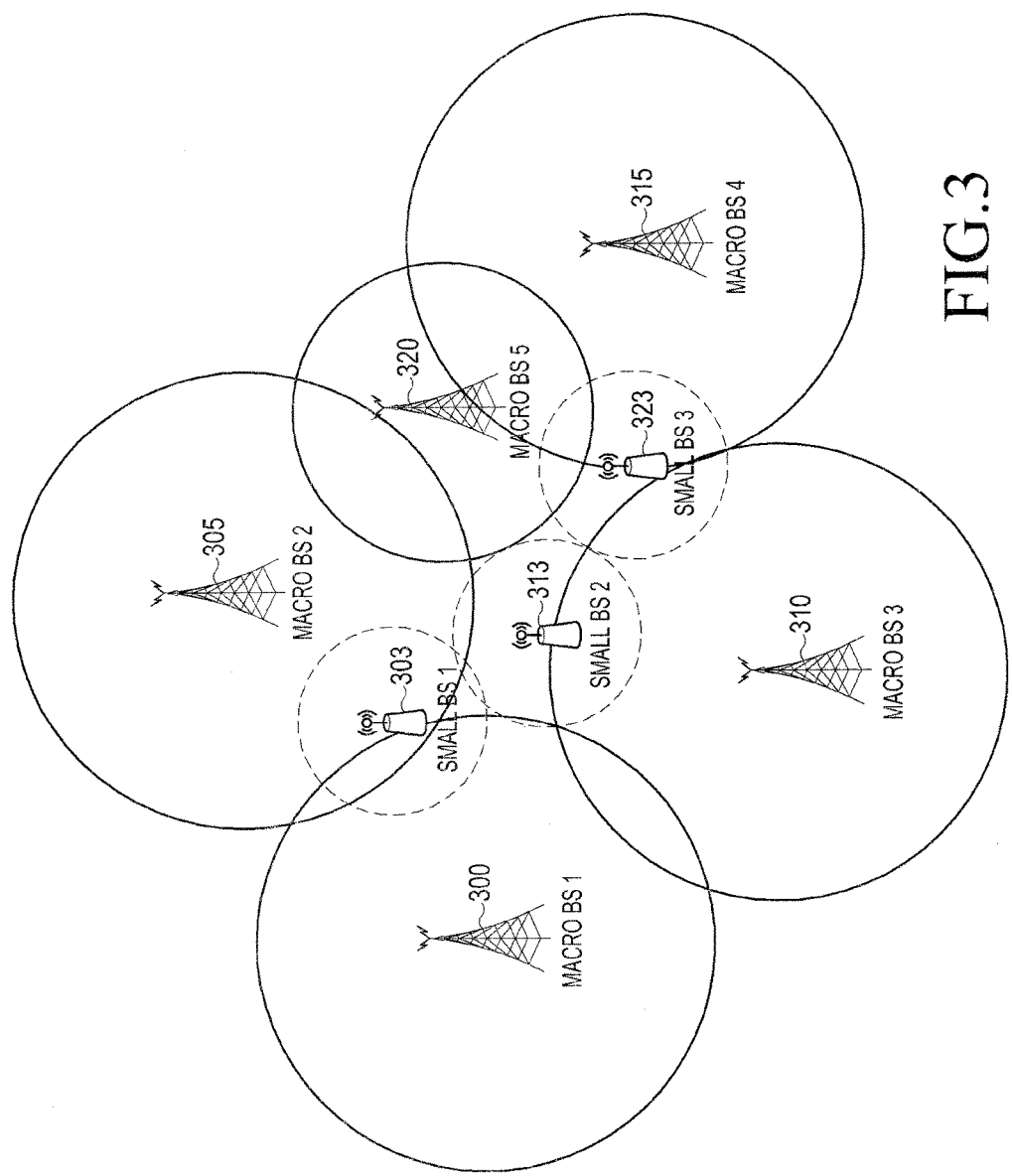
FIG. 3 illustrates deployment of small Base Stations (BSs) overlapped with macro BSs within the service areas of the macro BSs according to an exemplary embodiment of the present invention.

FIG. 3 illustrates deployment of small BSs overlapped with macro BSs within the service areas of the macro BSs according to an exemplary embodiment of the present invention.

Referring to FIG. 3, communication is supported in a specific area, for example, through five macro BSs 300, 305, 310, 315, and 320 (macro BS 1 to macro BS 5). Small BSs 303, 313, and 323 (small BS 1, small BS 2, and small BS 3) are additionally installed.

Small BS 1, small BS 2, and small BS 3 have lower transmission power or smaller service areas than macro BS 1 to macro BS 5. The small BSs may include a femto BS, a pico BS, a micro BS, an indoor BS, a cell-expanding relay, and a Remote Radio Head (RRH).

For example, small BS 1 and small BS 2 are installed across the boundaries of the service areas of macro BS 1, macro BS 2, and macro BS 3. If small BS 1 and small BS 2 operate in a specific situation, for example, in a rainy day or before a macro BS discontinues signal transmission, macro BS 1, macro BS 2, and macro BS 3 may cause interference to small BS 1 and small BS 2.

Accordingly, an aspect of the present invention provides a method of minimizing interference between a small BS and a macro BS and providing a seamless service irrespective of an environmental change by using the small BS only when the service area of the macro BS becomes suddenly smaller due to bad weather such as rain or snow or obstacles.

Figure 4:
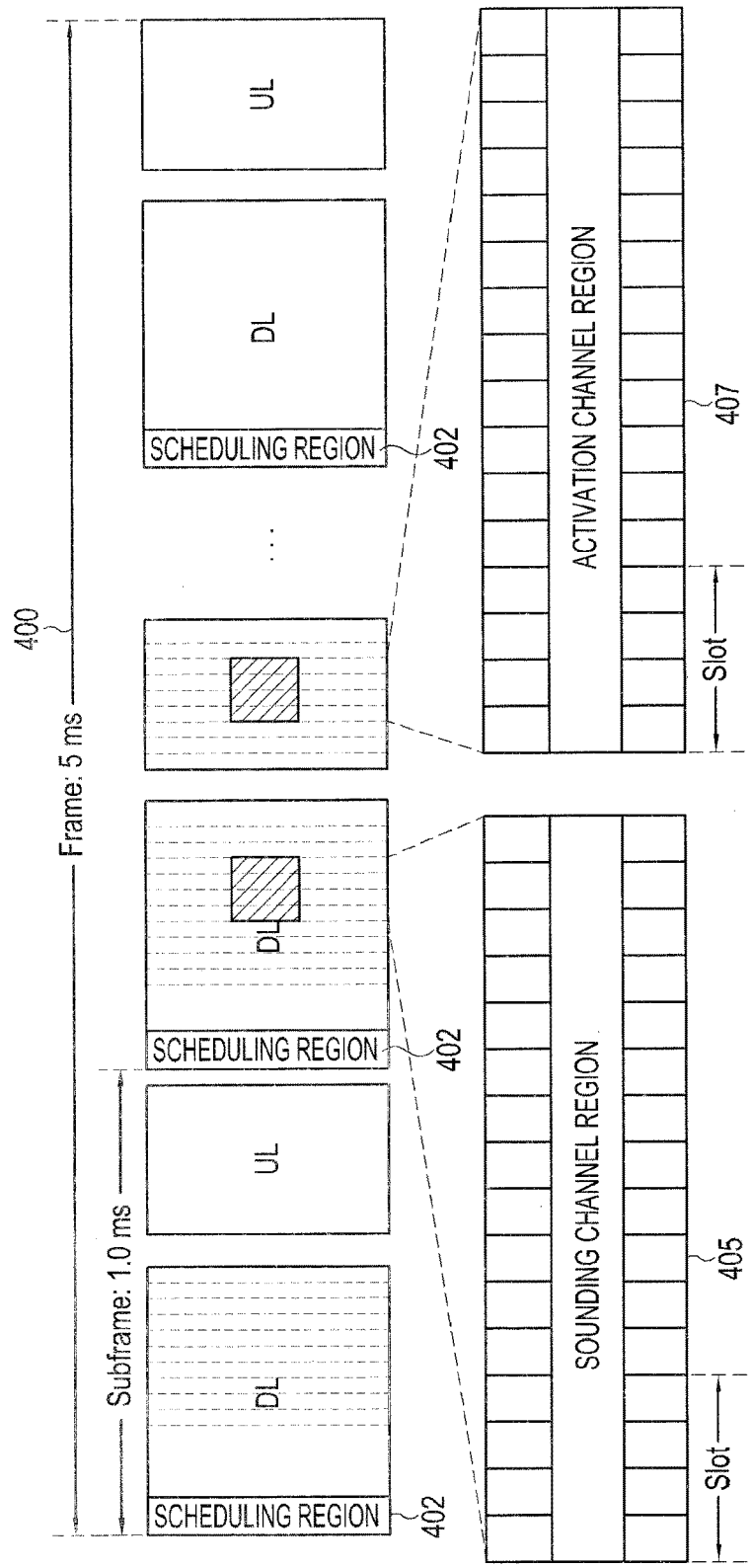
FIG. 4 illustrates a frame structure configured to efficiently control a small BS in a communication system using beamforming according to an exemplary embodiment of the present invention.

FIG. 4 illustrates a frame structure configured to efficiently control a small BS in a communication system using beamforming according to an exemplary embodiment of the present invention.

Referring to FIG. 4, a frame 400 is 5 ms long, including five subframes. Each subframe is divided into a DownLink (DL) region carrying a signal from a BS to an MS and an UpLink (UL) region carrying a signal from an MS to a BS. A part of the DL region is used as a scheduling region 402 in which scheduling information is transmitted. Another part of the DL region is used as a sounding channel region 405 carrying a DL reference signal of a small BS. A part of the UL region is used as an activation channel region 407 carrying an UL activation signal from an MS to a small BS. The sounding channel region 405 and the activation channel region 407 may be defined at fixed positions in the frame. Alternatively, the activation channel region 407 may be used more or less dynamically by signaling a position set by a management system to a macro BS and small BSs.

In an exemplary embodiment of the present invention, a small BS periodically measures the strength of a signal received from a macro BS and determines whether to operate based on the measured signal strength received from the macro BS. Specifically, the small BS measures the strength of a signal received from an adjacent macro BS at every measurement interval t_macro_measurement predetermined by the management system. The measurement interval t_macro_measurement may be set to be variable according to the position or ambient environment of the small BS. For example, if the small BS is located in a walled room, a frequently opened or closed room, a conference room, or the like, the measurement interval t_macro_measurement is set to be shorter for the small BS than for an outdoor small BS.

Subsequently, the small BS compares the signal strength measurement of the macro BS with a threshold and determines whether to operate based on the comparison result. Specifically, the small BS determines whether to operate in an active mode to communicate with MSs within its service area or in a dormant mode.

If the small BS determines to operate in the active mode, the small BS transmits a signal to or receives a signal from an MS within its service area using all available resources of a frame having the structure illustrated in FIG. 4, while periodically measuring the signal strength of the macro BS. If the small BS recognizes the presence of an MS that has established a connection and is communicating with the small BS, the small BS may control the connected MS to measure the signal strength of the macro BS and report the signal strength measurement to the small BS, rather than the small BS itself measures the signal strength of the macro BS periodically. On the other hand, if the small BS determines to operate in the dormant mode, the small BS discontinues all transmission and reception operations, except the periodic measurement of the signal strength of the macro BS.

Figure 5:
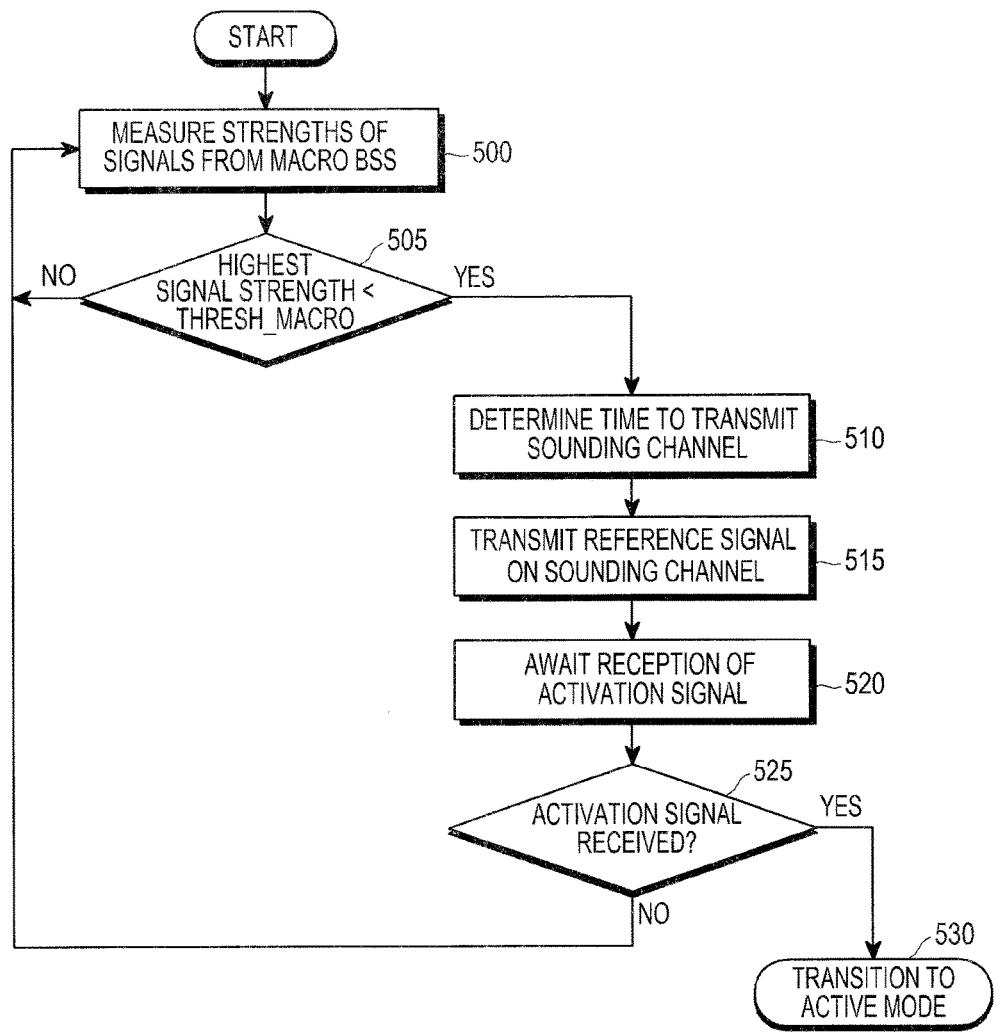
FIG. 5 is a flowchart illustrating an operation of a small BS in a dormant mode according to an exemplary embodiment of the present invention.

FIG. 5 is a flowchart illustrating an operation of a small BS in a dormant mode according to an exemplary embodiment of the present invention.

Referring to FIG. 5, the small BS in step 500 measures the strengths of signals received from adjacent macro BSs at every predetermined measurement interval t_macro_measurement and in step 505 compares the highest of the signal strength measurements of the macro BSs with a threshold thresh_macro preset by the management system. If the highest signal strength is equal to or greater than the threshold thresh_macro, the small BS returns to step 500 and stays in the dormant mode.

If the highest signal strength is less than the threshold thresh_macro, the small BS operates in an active mode after performing the following two steps 1-1 and 1-2 corresponding to steps 510 through 530.

In step 1-1, the small BS determines whether any MS is located within its service area using a part of the resources of the frame 400 illustrated in FIG. 4.

If the small BS determines the presence of any MS within its service area in step 1-1, the small BS transitions to the active mode to transmit signals to or receive signals from the MS within the service area of the small BS using all available resources of the frame 400 of FIG. 4 in step 1-2.

Specifically, the small BS determines in step 510 a time to transmit a reference signal within a sounding channel transmission period t_sounding_period predetermined by the management system. The small BS selects a random frame to carry the reference signal. The random selection of a frame may minimize interference between small BSs during the transmission period of the reference signal and extend the reception range of the reference signal. Reference signals transmitted from different small BSs may be distinguished according to the small BSs. For example, if the transmission period of a reference signal, t_sounding_period, is 200 ms, the small BS selects one or more frames randomly from among 40 frames defined in the 200-ms period. An Identifier (ID) of the small BS, a dormant period, and a probabilistic model of the paging patterns of MSs may be considered in the random selection. For the convenience of description, it is assumed that one frame is randomly selected. In step 515, the small BS transmits a reference signal corresponding to the ID of the small BS in the sounding channel region 405 supposed to carry a DL reference signal in the frame 400 of FIG. 4 in order to determine the presence of an MS that needs to communicate with the small BS within the service area of the small BS.

In step 520, the small BS awaits reception of an activation signal from an MS in the activation channel region of the selected frame.

Meanwhile, in step 525, upon receipt of an activation signal from at least one MS in the activation channel region of the frame, the small BS transitions to the afore-described step 1-2 in step 530. Specifically, the small BS discontinues transmission of a reference signal in the sounding channel region in the dormant mode and enters the active mode to transmit a signal to or receive a signal from the at least one MS in the entire area of a frame. Thus, the small BS acts like a general BS.

While not shown, if the small BS has not received an activation signal from an MS in the activation channel region in step 525 but has received an activation signal of the MS indirectly through an adjacent macro BS over a network, the small BS goes to step 1-2. Thus, the small BS discontinues transmission of a reference signal in the sounding channel region and enters the active mode to transmit a signal to or receive a signal from the MS in the entire area of a frame. Thus, the small BS acts like a general BS.

Meanwhile, if the small BS has received an activation signal in the activation channel region neither directly from an MS in step 525 nor indirectly through an adjacent macro BS, the small BS stays in the dormant mode, repeating steps 500 and 505.

According to another exemplary embodiment of the present invention, the small BS periodically measures the signal strength of the macro BS, while communicating with an MS in the active mode, like a general BS. If the active-mode small BS recognizes the existence of an MS connected to the small BS and communicating with the small BS, the small BS may control the MS to measure the signal strength of the macro BS and report the measured signal strength to the small BS, instead of periodically measuring the signal strength of the macro BS.

Figure 6:
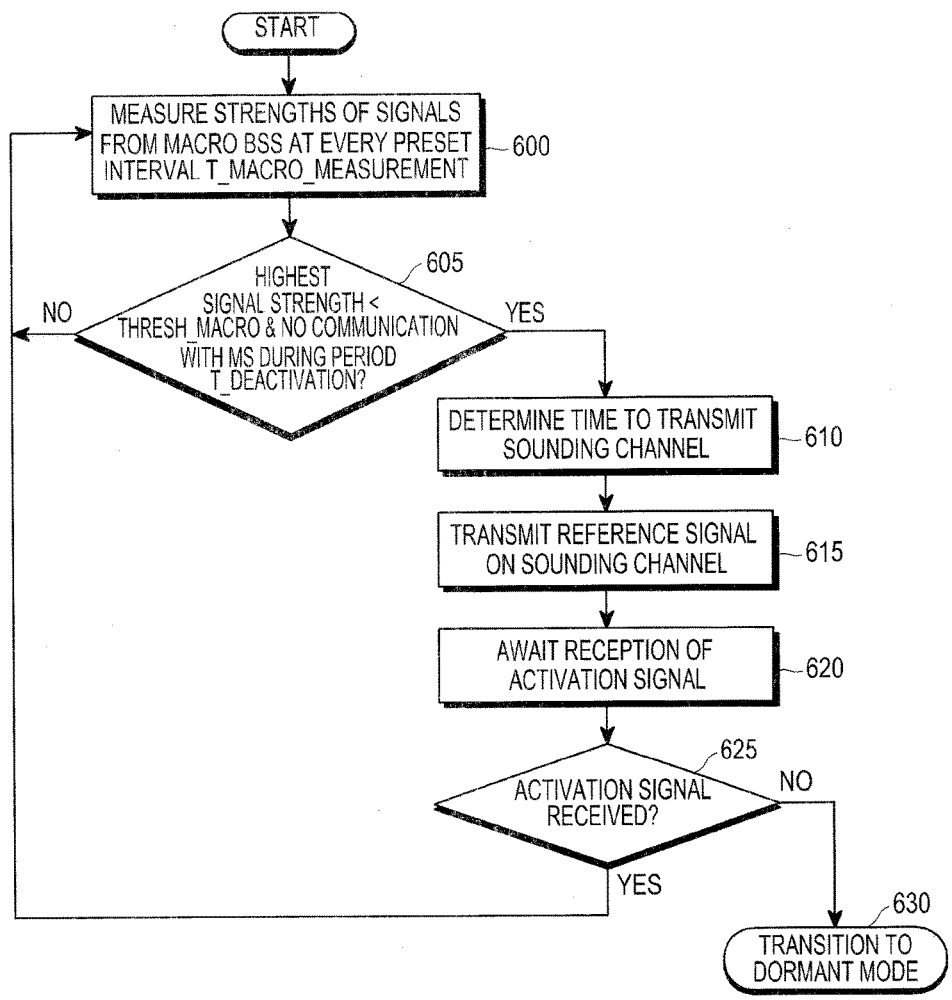
FIG. 6 is a flowchart illustrating an operation of a small BS in an active mode according to an exemplary embodiment of the present invention.

FIG. 6 is a flowchart illustrating an operation of a small BS in an active mode according to an exemplary embodiment of the present invention.

Referring to FIG. 6, the small BS measures the strengths of signals received from adjacent macro BSs at every predetermined interval t_macro_measurement in step 600. In step 605, the small BS determines whether a condition that the highest of the measured signal strengths of the adjacent macro BSs is equal to or greater than the threshold thresh_macro and a condition that the small BS has not communicated with an MS during a time period preset by the management system, t_deactivation are satisfied. If at least one of the two conditions is satisfied, the small BS returns to step 600 and maintains the active mode.

If the two conditions are satisfied, the small BS performs the following two steps 2-1 and 2-2 corresponding to steps 610 to 630 and then operates in the dormant mode.

In step 2-1, the small BS determines the presence of any MS within the service area of the small BS using a part of the resources of a frame having the structure illustrated in FIG. 4.

If no MS exists within the service area of the small BS in step 201, the small BS transitions to the dormant mode, discontinuing all signal transmissions in step 2-2.

Specifically, the small BS determines a time to transmit a sounding channel during the preset time period t_sounding_period in step 610. The small BS randomly selects a frame to deliver a reference signal. The random selection of a frame may minimize interference between small BSs during the transmission period of the reference signal and extend the reception range of the reference signal. Reference signals from different small BSs may be distinguished according to the small BSs. The ID of the small BS, an active period, and a probabilistic model of the paging patterns of MSs may be considered in the random selection. For the convenience of description, it is assumed that one frame is randomly selected. In step 615, the small BS transmits the reference signal corresponding to the ID of the small BS in the sounding channel region 405 supposed to carry a DL reference signal in the frame 400 of FIG. 4 in order to determine the presence of an MS that needs to communicate with the small BS within the service area of the small BS.

The small BS awaits reception of an activation signal from an MS in the activation channel region of the selected frame in step 620.

If the small BS has received an activation signal in the activation channel region neither directly from at least MS nor indirectly through an adjacent macro BS over a network in step 625, the small BS discontinues all signal transmissions and receptions to and from MSs and operates in the dormant mode, periodically measuring the strengths of signals received from adjacent macro BSs in step 630. Upon receipt of an activation signal in the activation channel region directly from at least one MS or indirectly through an adjacent macro BS in step 625, the small BS returns to step 600 and maintains the active mode.

Another exemplary embodiment of the present invention provides an operation of an MS to help efficient control of a small BS.

Figure 7:
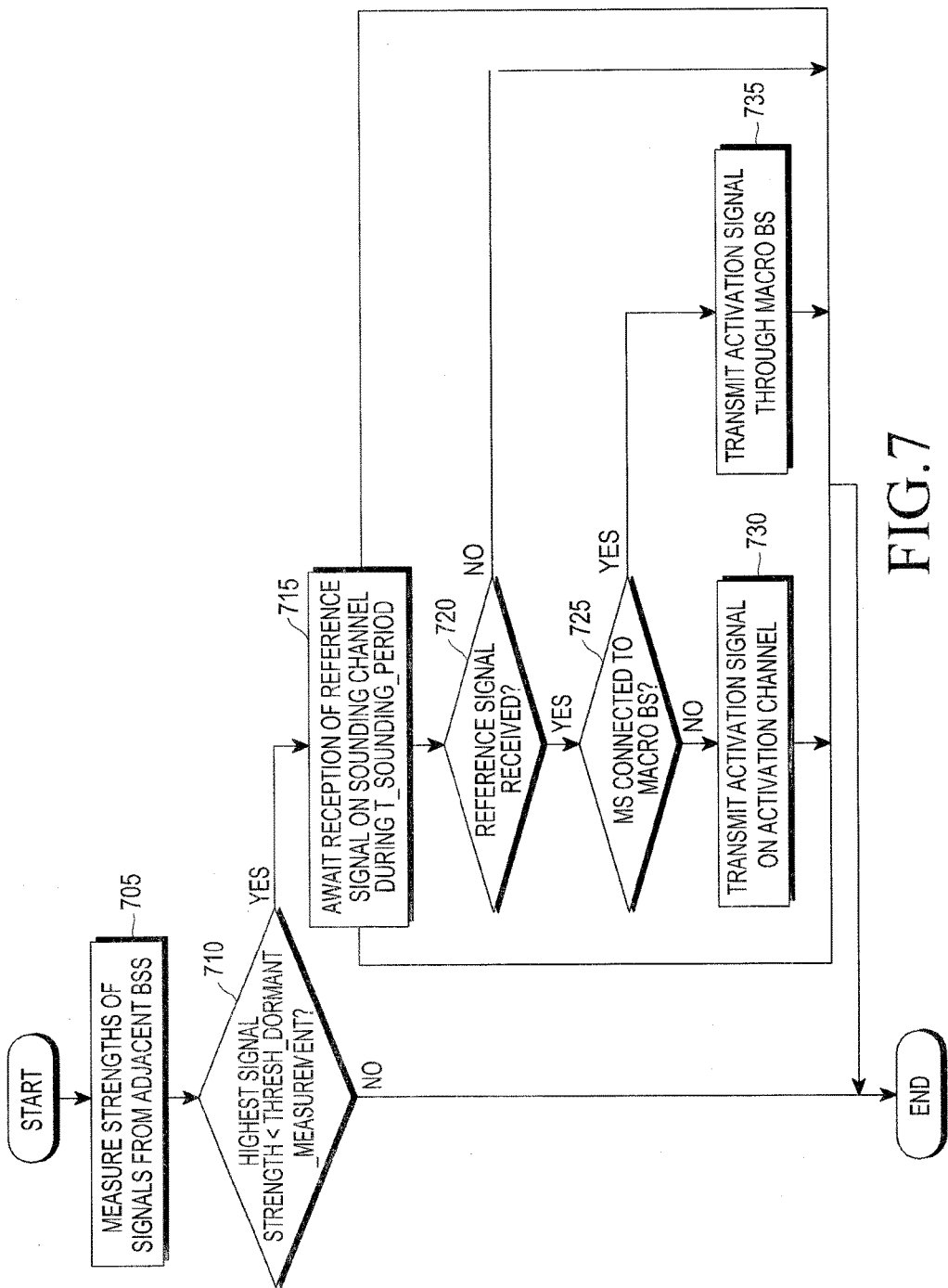
FIG. 7 is a flowchart illustrating an operation of a Mobile Station (MS) according to an exemplary embodiment of the present invention.

FIG. 7 is a flowchart illustrating an operation of an MS according to an exemplary embodiment of the present invention.

Referring to FIG. 7, the MS measures the strengths of signals received from adjacent BSs periodically or aperiodically in step 705. The adjacent BSs include a macro BS and small BSs.

In step 710, the MS determines whether the highest of the measured signal strengths of the adjacent BSs is less than a predetermined threshold thresh_dormant_measurement. The threshold thresh_dormant_measurement is received preliminarily from a macro BS servicing an area where the MS is located or preset between the MS and the macro BS. The threshold thresh_dormant_measurement may be equal to or different from the threshold thresh_macro.

If the highest signal strength is equal to or greater than the threshold thresh_dormant_measurement, the MS ends the procedure.

On the other hand, if the highest signal strength is less than the threshold thresh_dormant_measurement, the MS awaits reception of reference signals on sound channels from adjacent small BSs during the time period t_sounding_period in step 715. Upon receipt of a reference signal from at least one small BS in step 720, the MS determines whether the MS is connected to the macro BS in step 725. If the MS is not connected to the macro BS and the channel state between the MS and the macro BS is too poor to be connected to the macro BS, the MS requests activation of the small BS by transmitting an activation signal in the activation channel region 407 of the frame 400 having the structure illustrated in FIG. 4 in step 730. The activation signal may be the ID of the small BS received on the sounding channel, a reference signal corresponding to the ID of the small BS, or a preset signal. On the other hand, if the MS is connected to the macro BS or the channel state is so good as to establish a connection between the MS and the macro BS in step 725, the MS requests activation of the small BS by transmitting the ID of the small BS received on the sounding channel or a reference signal corresponding to the ID of the small BS to the macro BS in step 735.

If the MS has not received a reference signal from any small BS during the time period t_sounding_period in step 720, the MS ends the procedure.

Upon receipt of the activation request, the small BS operates in the active mode or the macro BS operates the small BS in the active mode.

Figure 8:
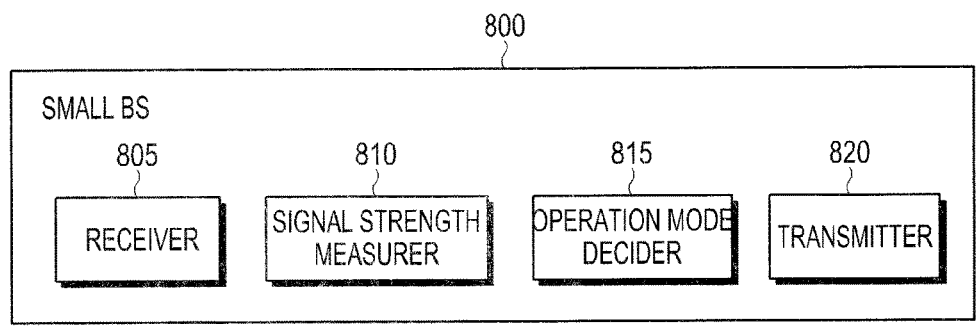
FIG. 8 is a block diagram of a small BS according to an exemplary embodiment of the present invention.

FIG. 8 is a block diagram of a small BS according to an exemplary embodiment of the present invention.

Referring to FIG. 8, a small BS 800 includes a receiver 805, a signal strength measurer 810, an operation mode decider 815, and a transmitter 820.

If the small BS 800 is placed in the dormant mode, the signal strength measurer 810 measures the strengths of signals received from adjacent macro BSs at every predetermined interval t_macro_measurement. The operation mode decoder 815 compares the highest of the signal strength measurements received from the signal strength measurer 810 with the threshold thresh_macro. If the highest signal strength is equal to or greater than the threshold thresh_macro, the operation mode decider 815 keeps the small BS 800 in the dormant mode.

Meanwhile, if the highest signal strength is less than the threshold thresh_macro, the operation mode decider 815 determines whether an MS is located within the service area of the small BS. In the presence of an MS within the service area of the small BS, the operation mode decider 815 transitions the small BS 800 to the active mode. To determine whether there is any MS within the service area of the small BS 800, at least one frame is selected randomly within the time period t_sounding_period. Then the transmitter 820 transmits a reference signal in the sounding channel region of the selected frame (e.g. the sounding channel region 405 of FIG. 4).

When the receiver 805 receives an activation signal in an activation channel region (e.g. the activation channel region 407) from an MS, the operation mode decider 815 discontinues transmitting a reference signal in the sounding channel region and transitions the small BS 800 to the active mode so that the small BS may transmit a signal to or receive a signal from the MS. If the receiver 805 has not received an activation signal in the activation channel region but has received the activation signal indirectly through an adjacent macro BS, the operation mode decider 815 transitions the small BS 800 to the active mode.

In another exemplary embodiment of the present invention, if the small BS 800 is in the active mode, the signal strength measurer 810 measures the strengths of signals received from adjacent macro BSs at every predetermined interval t_macro_measurement. The operation mode decider 815 compares the highest of the signal strength measurements received from the signal strength measurer 810 with the threshold thresh_macro. If at least one of a condition that the highest signal strength is less than the threshold and a condition that the small BS 800 has communicated with an MS during the preset period t_deactivation is satisfied, the operation mode decider 815 maintains the small BS 800 in the active mode.

If the highest strength is equal to or greater than the threshold thresh_macro and the small BS 800 has not communicated with an MS during the time period t_deactivation, the operation mode decider 815 determines whether there is any MS within the service area of the small BS 800. In the absence of any MS within the service area of the small BS 800, the operation mode decider 815 transitions the small BS 800 to the dormant mode. To determine whether there is any MS within the service area of the small BS 800, the operation mode decider 815 selects at least one frame randomly within the preset time period t_sounding_period. The transmitter 820 transmits a reference signal in the sound channel region (e.g. the sounding channel region 405 of FIG. 4) of the selected frame.

When the receiver 805 receives an activation signal from an MS in an activation channel region (e.g. the activation channel region 407 of FIG. 4), the operation mode decider 815 discontinues transmitting a reference signal in the sounding channel region and keeps the small BS in the active mode to transmit a signal to or receive a signal from the MS. On the other hand, if the receiver 805 has not received an activation signal from an MS in the activation channel region but has received the activation signal indirectly through an adjacent macro BS, the operation mode decider 815 keeps the small BS 800 in the active mode. If the receiver 805 has received an activation signal neither in the activation channel region from at least one MS nor indirectly through an adjacent macro BS, the operation mode decider 815 transitions the small BS 800 to the dormant mode.

Figure 9:
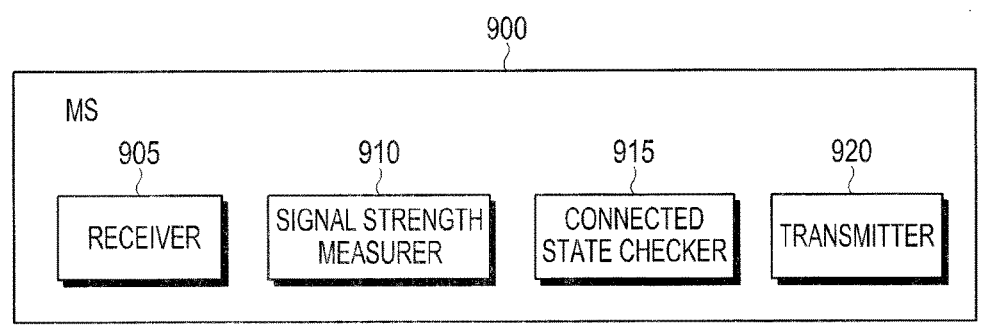
FIG. 9 is a block diagram of an MS according to an exemplary embodiment of the present invention.

FIG. 9 is a block diagram of an MS according to an exemplary embodiment of the present invention.

Referring to FIG. 9, an MS 900 includes a receiver 905, a signal strength measurer 910, a connected state checker 915, and a transmitter 920.

The signal strength measurer 910 measures the strengths of signals received from adjacent BSs including a macro BS and small BSs periodically or aperiodically.

The connected state checker 915 determines whether the highest of the signal strength measurements is less than the preset threshold thresh_dormant_measurement. The threshold thresh_dormant_measurement is signaled preliminarily by a macro BS servicing an area where the MS is located or preset between the macro BS and the MS. The threshold thresh_dormant_measurement may be equal to or different from the threshold thresh_macro.

If the highest of the signal strength measurements is less than the preset threshold thresh_dormant_measurement, the receiver 905 awaits reception of reference signals in a sounding channel region (e.g. the sounding channel region 405 of FIG. 4) from the adjacent small BSs. When the receiver 905 receives a reference signal from at least one small BS, the connected state checker 915 checks the connection state between the MS and the macro BS. If the MS is not connected to the macro BS or the channel state between the MS and the macro BS is too poor to connect the MS to the macro BS, the transmitter 920 requests activation to the small BS. If the MS is connected to the macro BS or the channel state is so good as to connect the MS to the macro BS, the transmitter 920 requests activation of the small BS to the macro BS.

Upon receipt of the activation request, the small BS operates in the active mode or the macro BS operates the small BS in the active mode.

As described above, only if a specific condition is satisfied, a small BS operates in the active mode. Otherwise, the small BS operates in the dormant mode. Therefore, interference between the small BS and a macro BS can be minimized and a seamless service can be provided irrespective of an environmental change.

As is apparent from the above description of the exemplary embodiments of the present invention, interference between a small BS and a macro BS can be minimized and a seamless service can be provided irrespective of an environmental change. This is because the activation or deactivation of the small BS is determined based on a comparison between a preset threshold and the signal strength of the macro BS measured periodically by the small BS and according to whether there is any MS within the service area of the small BS.

It should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for communicating with at least one mobile station (MS) by a small base station (BS) in a communication system, the method comprising:
   measuring, by the small BS operated in a dormant mode, strengths of signals received from a plurality of macro BSs;
   comparing, by the small BS, at least one of the strengths of the signals and a threshold;
   when at least one of the strengths of the signals is equal to or greater than the threshold, maintaining, by the small BS, the dormant mode; and
   when at least one of the strengths of the signals is less than the threshold, performing, by the small BS, operations for transitioning to an active mode,
   wherein the operations for transitioning to the active mode comprise:
      determining, by the small BS, at least one frame among a plurality of frames set for transmitting information of the small BS based on all of an identifier of the small BS, a dormant period and a probabilistic model of a paging pattern of one or more MSs,
      transmitting, by the small BS, to the at least one MS, the information of the small BS at the at least one frame while the small BS is operated in the dormant mode, and
      when an activation signal is received from one of the at least one MS, transitioning, by the small BS, to the active mode from the dormant mode.

2. The method of claim 1,
   wherein, when the MS is not connected to a macro BS of the plurality of macro BSs, the activation signal is received from the MS, and
   wherein the service coverage of the small BS is located at edges between service coverages of the plurality of macro BSs.

3. The method of claim 1, wherein, when the at least one of the strengths of the signals is equal to or greater than the threshold, and the small BS has not communicated with at least one MS during a predetermined time period, maintaining the dormant mode.

4. The method of claim 1, further comprising:
   during operating the active mode, determining whether there is the at least one MS within a service coverage of the small BS;
   transmitting, if there is the at least one MS within the service coverage of the small BS, a request signal for reporting strengths of signals of the plurality of macro BSs to the at least one MS; and
   receiving the strengths of signals of the plurality of macro BSs measured by the at least one MS.

5. The method of claim 1, wherein the strengths of signals received from the plurality of macro BSs are measured according to a measurement interval which is determined based on a location of the small BS or an environment of the small BS.

6. The method of claim 1, wherein the at least one frame is randomly selected based on the at least one of the identifier of the small BS, the active period during which the small BS is in an active mode and the probabilistic model of a paging pattern of one or more MSs.

7. A small base station (BS) for communicating with at least one mobile station (MS) in a communication system, the small BS comprising:
   a transceiver configured to transmit signals based on controlling by a controller; and
   the controller configured to:
      measure, while the small BS is operated in a dormant mode, strengths of signals received from a plurality of macro BSs,
      compare at least one of the strengths of the signals and a threshold,
      if at least one of the strengths of the signals is equal to or greater than the threshold, maintain the dormant mode, and if at least one of the strengths of the signals is less than the threshold, perform operations to transit to an active mode, wherein the operations comprise:
   determining at least one frame among a plurality of frames set for transmitting information of the small BS based on all of an identifier of the small BS, a dormant period and a probabilistic model of a paging pattern of one or more MSs,
   controlling the transceiver to transmit, to the at least one MS, the information of the small BS at the at least one frame while the small BS is operated in the dormant mode, and
   if the transceiver receives an activation signal from one of the at least one MS, transiting to the active mode from the dormant mode.

8. The small BS of claim 7,
wherein if the MS is not connected to a macro BS of the plurality of macro BSs, the activation signal is received from the MS; and
wherein a service coverage of the small BS is located at edges between service coverages of the plurality of macro BSs.

9. The small BS of claim 7, wherein if at least one of the strengths of the signals is equal to or greater than a threshold and the small BS has not communicated with at least one MS during a predetermined time period, the controller is configured to maintain the dormant mode.

10. The small BS of claim 7, further comprising:
   during operating the active mode, the controller is configured to determine whether the at least one MS within a service coverage of the small BS; and
   if the at least one MS is within the service coverage of the small BS, the transceiver is configured to transmit a request signal for reporting strengths of signals of the plurality of macro BSs to the at least one MS, and receive the strengths of signals of the plurality of macro BSs measured by the at least one MS.

11. The small BS of claim 7, wherein the at least one frame is randomly selected based on the at least one of the identifier of the small BS, the active period during which the small BS is in an active mode and the probabilistic model of a paging pattern of one or more MSs.

* * * * *